United States Patent [19]
Martin, Jr.

[11] Patent Number: 5,634,488
[45] Date of Patent: Jun. 3, 1997

[54] MODULAR VALVE SERVICE BOX

[75] Inventor: Thomas J. Martin, Jr., Kearny, N.J.

[73] Assignee: C.P. Test Services-Valvco, Inc., Kearny, N.J.

[21] Appl. No.: 650,379

[22] Filed: May 20, 1996

[51] Int. Cl.$^6$ .................................................. F16L 5/00
[52] U.S. Cl. ........................ 137/370; 137/364; 137/367; 137/369
[58] Field of Search .................... 137/368–371, 137/363, 367, 364

[56] References Cited

U.S. PATENT DOCUMENTS

| | | | |
|---|---|---|---|
| 407,955 | 7/1889 | Kallaher et al. | 137/369 |
| 3,548,864 | 12/1970 | Handley et al. | 137/364 |
| 3,601,143 | 8/1971 | Glennon | 137/364 |
| 4,239,056 | 12/1980 | Shope | 137/370 |
| 4,333,494 | 6/1982 | Shope | 137/364 |

FOREIGN PATENT DOCUMENTS 521359  1/1956  Canada .................................. 137/363

*Primary Examiner*—A. Michael Chambers
*Attorney, Agent, or Firm*—Clifford G. Frayne

[57] ABSTRACT

A modular valve service box having a modular element cooperative with variable sized valve housings in order to secure variable sized valve housings beneath the ground and provide a conduit for access to same.

18 Claims, 3 Drawing Sheets

MODULAR VALVE SERVICE BOX

BACKGROUND OF THE INVENTION

1. Field of the Invention

The present invention relates to valve services boxes, more commonly known as curb boxes, which generally have an upper portion having at least one pair of telescoping tubular members and a lower tubular member having a housing formed thereon for encasement of a valve buried beneath the surface of the ground.

2. Description of the Prior Art

Valve service boxes, commonly known as curb boxes, are well known in the art. Modern valve boxes are generally fabricated of some suitable plastic, such as either a filled or unfilled ABS. The upper portion comprises generally a pair of telescoping tubular members cooperative with a lower member which defines a valve housing. The lower member fits over the valve housing protecting the valve and maintaining the valve in a proper position while allowing the underground utility, gas, water or the like, to extend outwardly from the valve.

The size of the valves used by utility companies, and the size and material used with the underground utility lines has undergone great development over the past years. This development of valve and valve materials and pipe materials has been the impetus for the development of certain developments in valve service boxes as evidenced in U.S. Pat. No. 3,601,143 for a valve service box which engaged a portion of the valve and pipe in order to prevent the torsional twisting of the valve; U.S. Pat. No. 4,239,056 which allowed the valve box to accommodate two different sized valves; U.S. Pat. No. 4,333,494 which provided a selective means for allowing the housing member of the valve box to be sized to fit different sized valves. Each of the aforementioned patents were developed by and assigned to the assignee of the instant application.

The underground utility industry has in recent years become more competitive and have sought to find the lowest cost for valve models and sizes which meet the testing requirements for the utility. Therefore, instead of standardizing all of the valves in a system, the utility companies now find themselves utilizing valves from different manufacturers, perhaps along the same utility line path and each of the valves may have a radically different physical geometry so that one valve box model cannot accommodate the full range of valve models and sizes which meet the testing requirements and are approved by the utility company and purchased by the utility company.

The utility company then finds itself having to maintain a large inventory of valve service boxes to accommodate the different physical geometries of the valves.

In most instances, it is only the lower portion of the valve box, namely, the valve housing portion which must vary in order to accommodate the valve, but thus far in the industry, the telescoping tubular members which extend upwardly to the ground surface from the housing member are manufactured integrally with the housing member and thus are designed for use with one particular housing member. The utility company must therefore maintain an inventory of complete valve service boxes including the telescoping tubular members as well as the housing member for each valve that it maintains in its inventory which is approved for use.

The present invention of Applicant relates to an improved valve service box assembly in which the housing member is designed to fit each specific type and size of valve, but the telescoping tubular section is modified such that the tubular member engaging the housing member can fit a plurality of different sized housing members which thereby standardizes that portion of the valve service box which extends upwardly from the housing member. In this type of configuration, it would be possible for the manufacturer to manufacture the housing member and include the housing member in the sale of the valve and package the housing member with the valve. The utility then only needs to maintain an inventory of the novel telescoping tubular members as set forth herein which can be adapted to any one of a plurality of valves and the respective housing member which accompanies the valve at the point of sale.

OBJECTS OF THE INVENTION

It is an object of the present invention to provide for a novel valve service box which minimizes the inventory required to be maintained by a utility company with respect to valve service boxes.

It is a further object of the present invention to provide for a novel valve service box in which the housing member can be sized to the particular geometric shape of the valve and the telescoping tubular members extending upwardly therefrom, can be universally sized to fit a plurality of the particular housing members.

It is a still further object of the present invention to provide for a novel valve service box which maintains the valve body in its correct position for actuation from ground level and reduces torque on the valve body from the valve lines extending outwardly therefrom.

It is a still further object of the present invention to provide for a novel valve service box in which the telescoping tubular members designed to engage a plurality of different valve housing members maintains the integrity of the valve service box and the protection of the valve body.

SUMMARY OF THE INVENTION

A modular valve service box having a modular element cooperative with variable sized valve housings in order to secure variable sized valve housings beneath the ground and provide a conduit for access to same.

BRIEF DESCRIPTION OF THE DRAWINGS

The objects and advantages aforesaid as well as other objects and advantages may be achieved by the valve service box claimed herein, embodiments of which are illustrated in the drawings in which:

DETAILED DESCRIPTION OF THE DRAWINGS

Figures 1, 2:
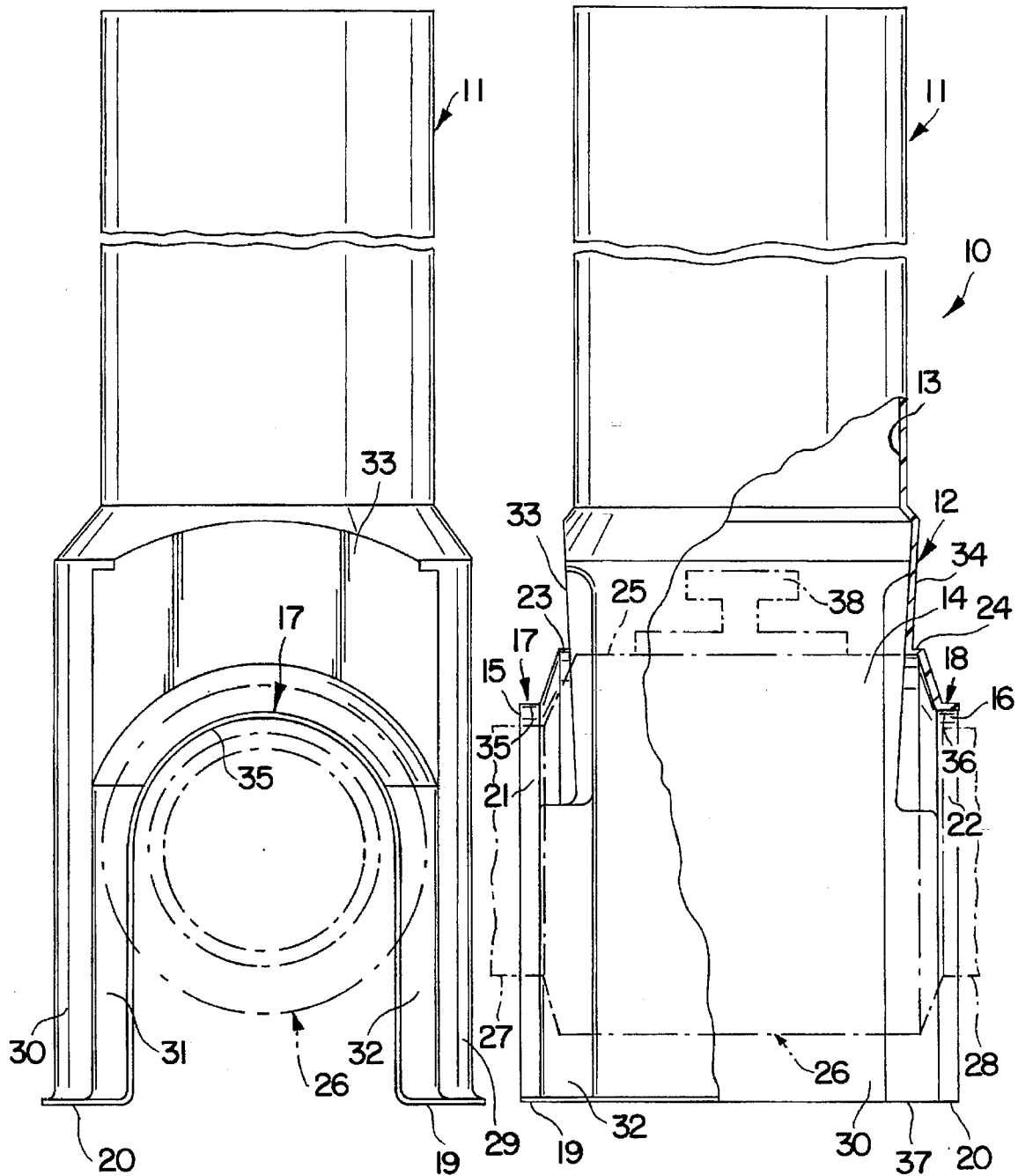
FIG. 1 is a side elevational view of one form of valve box housing illustrating a unitized, valve body with integral inlet and outlet conduits extending therefrom shown schematically in broken lines.
FIG. 2 is a front elevational view of the valve box illustrated in FIG. 1.

Referring now to the drawings in detail, and in particular, to the valve box illustrated in FIGS. 1 and 2 which comprises a valve box utilized in the trade for engaging the valve body in the utility line beneath the ground. The valve housing description is illustrative and useful in understanding Applicant's advancement of the structure and function of a valve service box.

The valve box 10 comprises a generally vertically elongated tubular or hollow cylindrical member 11 having formed thereon at the bottom, a hollow valve box housing 12. The hollow interior 13 of the member 11 communicates with the hollow interior 14 of the housing 12. Preferably, the member 11 and housing 12 are integral with the housing 12 formed by blow molding techniques employing ABS as the material of fabrication.

By virtue of the use of blow molding techniques, the interior surface of the housing 12 conforms to its exterior surface.

The housing 12 is provided with a pair of diametrically opposed side openings 15 and 16 which are closed at the top thereof respectively, 17 and 18, and open at the bottom respectively, 19 and 20.

The top 17 and 18 of the openings 15 and 16 may be arcuate although in a regular geometric may be optionally employed. The periphery of each of the openings 15 and 16 is provided with an external upstanding flange respectively 21 and 22.

The housing 12 is provided with a pair of internal inwardly extending ribs respectively, 23 and 24, generally concentric with and spaced vertically away from the tops 17 and 18 of the openings 15 and 16. The ribs 23 and 24 provide bearing means for engagement to the top 25 of a valve body 26. The valve body 26 as illustrated has a generally cylindrical configuration. Accordingly, the ribs 23 and 24 are arcuate so as to provide conforming bearing surfaces. Nevertheless, were the valve bodies 26 to have a non-circular cross-sectional configuration, the ribs 23 and 24 may be fabricated to conform to the cross-sectional configuration of the valve body 26. Even if the valve body 26 were to have a non-circular cross-sectional configuration, an arcuate rib, such as illustrated as 23 and 24, would also provide a bearing surface for engagement of the valve body, but the engagement would not be continuous along the rib which is a preferred embodiment.

A typical valve body 26 is formed integrally with lateral inlet and outlet conduits respectively 27 and 28, which extend through openings 15 and 16, respectively. The ribs 23 and 24 are positioned with respect to the openings 15 and 16 and to the configuration and dimensions of the valve body 26 so that the conduits 27 and 28 are vertically spaced away from the top 17 and 18 of the openings 15 and 16, respectively. Accordingly, the ribs 23 and 24 provide a positive limit for the upward movement of the valve body 26 in the interior 14 of the housing 12. Thus, any vertically imposed bearing loads are first imposed on the strong, massive valve body 26 and not on the conduits 27 and 28. Preferably, the housing 12 is dimensioned to receive the entire valve body 26 before the ribs 23 and 24 are engaged. This, in turn, transmits most vertical loading to the bottom of the sidewalls 29 and 30 of housing 12.

The housing 12 is relatively thin walled and the openings 15 and 16 comparatively large. Accordingly, it is desirable to provide bearing surfaces on the sides of the housing 12 to increase the rigidity so that vertical loads are substantially entire in compression and to prevent rotation of the housing 12 about its vertical axis. The housing 12 is provided with a pair of externally, generally vertically extending flat portions 31 and 32, adjacent to each opening 15 and 16. Additionally, the housing 12 is provided with a vertically extending flat portion 33 and 34 above the top 17 and 18, respectively, of openings 15 and 16.

In accordance with good practice and also as a preferred embodiment of this invention, it is the provision of an outwardly extending flange 35 and 36 surrounding openings 15 and 16, respectively. Flanges 35 and 36 provide an added measure of protection for the conduits 27 and 28 by removing the possibility that a sharp edge extending vertically there into might cut into said conduits.

The flats, 31, 32, 33 and 34 also provide a bearing surface for backfill around the housing 12 which helps prevent distortion of the housing under vertical loads which might conceivably permit the valve body 26 to move up past ribs 23 and 24 so as to impose vertical loads on conduits 27 and 28.

Again, in conformity with general practice, a radially-extending flange 35 is provided on the bottom edge of housing 12 so as to provide a bearing surface greater than the thickness of the edge. In operation, the valve actuating member 38 desirably extends vertically upwardly, generally centrally located with respect to the hollow interior 13 of conduit 11. The actuating tool, which is provided on the end with an elongated shaft, extends downwardly through member 11 into the interior 14 of housing 12 to engage the actuating member 38. The actuating tool, which is generally in the form of a yoke, must have sufficient clearances from the interior walls of the housing 12 on opposite sides of the actuating member 38 so as to permit rotation.

In the embodiment of the invention, as illustrated in FIGS. 1 and 2, the size of the valve itself dictates the minimum dimensions of the interior of the housing 12 thereby providing sufficient clearance between the actuating member 38 in the interior of the housing. However, in some instances, the diameter of the valve body 26 is sufficiently great with respect to its width along the horizontal axis that a radially enlarged portion of a valve housing 12 must be provided.

It is the Applicant's intent that the valve housing 12 can be dimensioned for the plurality of valves manufactured and approved for a particular underground use with a particular utility. The valve housing itself could in fact be manufactured and sold directly to the valve manufacturer for inclusion in the valve kit when sold to a utility. In this manner, the valve manufacturer and the utility are assured that the valve which they are purchasing and which they remove from its packaging also contain the appropriate valve housing to engage the valve in the valve service box to alleviate the torsion and bearing concerns previously set forth herein.

Figure 3:
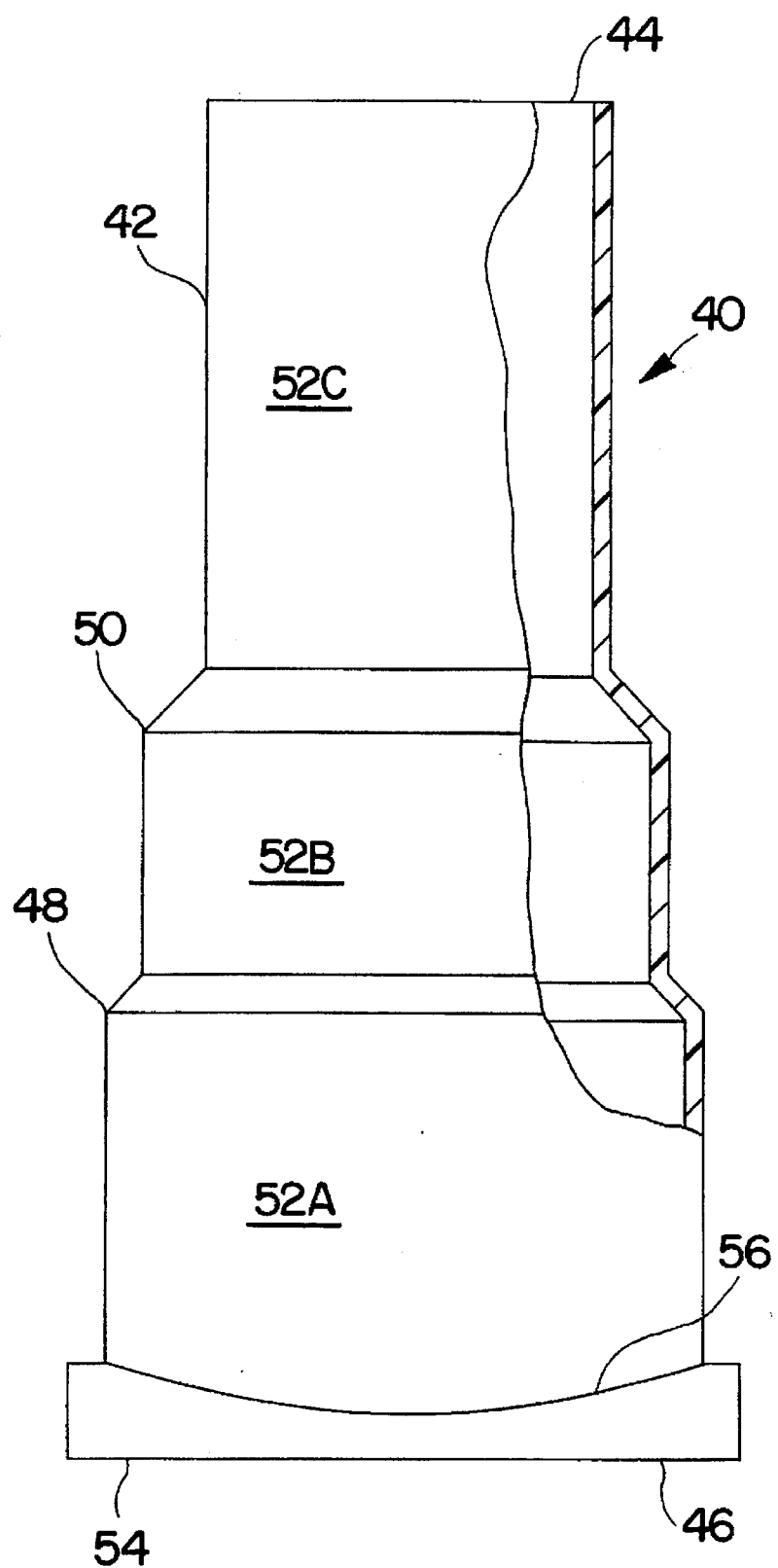
FIG. 3 is a side elevational view of a modular universal tubular member for engagement with the valve box housing.

FIG. 3 is a side elevational view of the modular, universal tubular extension 40 hereinafter referred to as modular extension 40. Modular extension 40 comprises a generally vertically elongated tubular hollow cylindrical member 42 having an upper opening 44 and a lower opening 46. Modular extension 40 is formed by blow molding techniques employing ABS as the material of fabrication. By virtue of use of the blow molding technique, the interior surface of modular extension 40 conforms to its exterior surface.

It will be noted that modular extension 40 varies in circumference from its lower opening 46 to its upper opening 44. Vertically elongated tubular or hollow cylindrical member 42 is stepped so as to provide a larger circumference and inner diameter proximate to lower end 46 and a smaller circumference and inner diameter proximate to upper opening 44. In the embodiment shown in FIG. 3, two such steps or transition zones are identified at 48 and 50. The presence of two such steps or transition zones 48 and 50 on elongated tubular cylindrical member 42 thereby defines three distinct inner diameters decreasing in dimension from 52A to 52B, to 52C, the inner diameter dimension decreasing as one progresses from lower opening 46 to upper opening 44. Additional steps in modular extension 40 could be incorporated so as to provide for accommodation of additional sized cylindrical members 11.

Modular extension 40 is manufactured with a flat circumferential lower end surface 54 defining lower opening 46. However, one will note that with respect to valve box 10 and the transition zone between the vertically elongated tubular cylindrical member 11 and the hollow valve box housing 12, as illustrated in FIGS. 1 and 2, there is often a slope or arcuate area. Therefore, modular extension 40, at its lower end, is formed in the blow molding technique with a punch-out or tear-out area 56 which can be removed by the installer, in the field, so that circumferential surface 54 is no longer flat and planar, but rather, slightly arcuate to allow surface 54 to engage and conform to the upper surface of hollow valve box housing 12.

As stated previously, valve housing box 12 would be dimensioned to conform to the particular valve to be enclosed therein. Depending upon the size of the valve, vertically elongated tubular cylindrical member 11 may be of varying diameter. Modular extension 40, because of its stepped cylindrical wall construction, can be made to accommodate vertically elongated tubular members 11 of varying diameter. The embodiment disclosed in FIG. 3 could accommodate a vertically elongated tubular cylindrical member 11 of valve box 10 having two different diameters with the largest diameter slidably securable within modular extension 40 with its upper circumferential surface engaging step 48. A vertically elongated tubular cylindrical member 11 having a slightly less dimensioned diameter would be slidably securable within modular extension 40 with its upper circumferential surface engaging step 50. It should be noted that modular extension 40 could be fabricated with more than the two steps 48 and 50 illustrated in the embodiment in FIG. 3.

Figure 4:
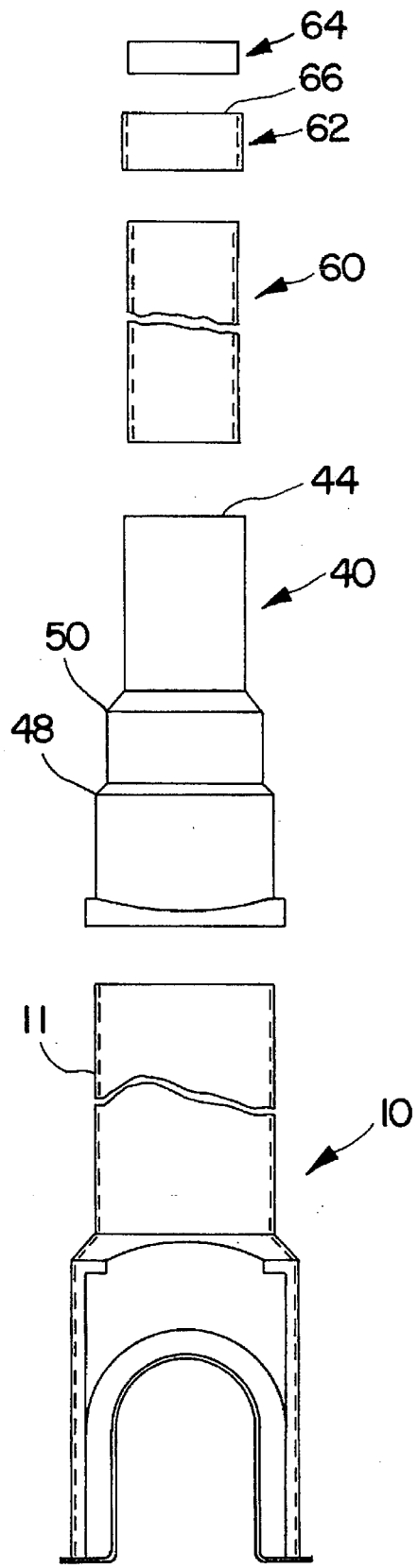
FIG. 4 is a side exploded view of a valve box housing with modular universal member and tubular extension.

Upper opening 44 of modular extension 40 would be dimensioned to accommodate the standard sized dimension of tubular members which would extend upwardly from modular extension 40 to the ground surface. This is best illustrated in FIG. 4 which is a partially exploded side view of the entire curb box. Modular extension 40 would be frictionally snap-fit and secured over valve box 10 such that the upper circumferential surface of vertically elongated tubular cylindrical member 11 engages the step 48 or 50 in modular extension 40 which conforms to the diameter of vertically elongated tubular cylindrical member 11 of valve box 10. A cylindrical tubular member 60 having an outer diameter dimensioned to the inner diameter of opening 44 in modular extension 40 would be frictionally engaged within the upper end of modular extension 40 or secured by means of an adhesive therein, tubular member 60 extending upwardly to ground level at which point it would be frictional or adhesively secured to a collar 62, preferably made of cast iron as know and used in the art, collar 62 having a closure means in the form of a valve box cap or cover 64 secured thereto. Closure 64 would be secured in collar 62 in a recessed manner, such that the upper surface 66 of collar 62 would be planar with the surface of the ground.

In this configuration, the utility worker has access to the valve by means of the removal of closure 64 to permit a valve engaging tool to be inserted downwardly through tubular member 60, modular extension 40, to valve housing 12 for engagement with the operative portion of the valve so as to either engage the valve into an opened position or closed position.

The use of the modular extension 40 permits the utility company to maintain a standardized tubular member 60 having a fixed diameter and standardized collars and closure means 62 and 64. Additionally, a standardized modular extension 40 can be maintained by the utility company thereby reducing inventory and cost requirements and ensuring the utility company that regardless of the valve size and the valve housing size requirements, its standardized inventory of modular extension 40 and tubing 60 can be utilized to install a utility line regardless of the size of the valves or the make or geometry of the valves utilized.

While the present invention has been described in connection with the exemplary embodiment thereof, it will be understood that many modifications will be apparent to those of ordinary skill in the art; and that this application is intended to cover any adaptations or variations thereof. Therefore, it is manifestly intended that this invention be only limited by claims and the equivalents thereof.

What is claimed is:

1. A valve box comprising:

a first generally vertically elongated hollow member open at its bottom end and its top end;

a hollow valve housing formed on the bottom end of said first member, the interiors of said member and said housing communicating, said hollow valve housing having a diameter greater than said first member thereby defining an annular upper surface of said hollow valve housing about said first member, the housing being open at its bottom end and adapted to receive a valve body having diametrically opposed inlet and outlet conduits extending generally horizontally therefrom;

at least two (2) diametrically opposed inlet and outlet conduit receiving openings in the side of said housing, each said opening being closed at the top and communicating with the opened bottom end of said housing;

internal bearing means on the housing adapted to engage said valve body to positively limit its upward movement in the housing;

the valve body engaging the bearing means when said inlet and outlet conduits are vertically spaced away from the top of the respective conduit openings;

a second generally vertically elongated hollow member open at a bottom end and a top end, said second generally vertically elongated member having a circumferential stepped sidewall presenting distinct decreased diameters from said bottom end towards said top end, said first generally vertically elongated hollow member slidably engageable into said bottom end of said second member, said top end of said first generally vertically elongated hollow member in stopped engagement with a respective step of said stepped sidewall corresponding to said diameter of said first generally vertically elongated hollow member;

a third generally vertically elongated hollow member opened at a bottom end and a top end, said bottom end slidably engageable with said top end of said second generally vertically elongated hollow member and selectively secured thereto, said third generally vertically elongated hollow member slidably adjustable with said second generally vertically elongated hollow member for adjustment in height;

a collar and closure means cooperable with said top end of said third generally vertically elongated hollow member, said collar being secured to said top end of said third generally vertically elongated hollow member and said closure means cooperable with said collar for securing said top of said third generally vertically elongated hollow member, said closure removable from said collar member for access to said valve.

2. The valve box in accordance with claim 1 wherein said second generally vertically elongated hollow member is formed with an arcuate perforation on said bottom end, selectively removable to allow said bottom end of said second generally vertically elongated hollow member to conform to and engage said upper annular surface of said hollow valve housing.

3. The valve box in accordance with claim 1 wherein said second generally vertically hollow member has a plurality of decreased diameters of said circumferentially stepped sidewall from said bottom end to said top end.

4. The valve box in accordance with claim 1 wherein said second generally vertically elongated hollow member is engageable with said top end of said first generally vertical elongated hollow member wherein said first generally vertically elongated hollow member may have a plurality of different diameters.

5. The valve box in accordance with claim 1 wherein said second generally vertically elongated hollow member is frictionally engageable with said first generally vertically elongated hollow member.

6. The valve box in accordance with claim 1 wherein said second generally vertically elongated hollow member is formed by blow molding such that said inner surface and said outer surface are in conformance with each other.

7. An improved valve box comprising:

a first generally vertically elongated hollow member open at its bottom end and its top end, a hollow valve housing formed on the bottom end of said first member, the interiors of said member and said housing communicating, said hollow valve housing having a diameter greater than said first member thereby defining an annular upper surface of said hollow valve housing about said first member, the housing being open at its bottom end and adapted to receive a valve body having diametrically opposed inlet and outlet conduits extending generally horizontally therefrom, at least two diametrically opposed inlet and outlet conduit receiving openings in the side of said housing, each of said opening being closed at the top and communicating with the open bottom end of said housing;

a second generally vertically elongated hollow member opened at a bottom and a top end, said generally vertically elongated hollow member having a collar and a closure means cooperable with said top end, said bottom end extending downwardly in relationship with said first generally vertically elongated hollow member, said collar enclosure means being positioned proximate the surface of the ground, the improvement comprising:

a modular valve box adaptor being a third generally vertically elongated hollow member open at a bottom end and a top end, said modular valve box adaptor having a circumferentially stepped sidewall presenting distinct decreased diameters from said bottom end towards said top end, said modular valve box adaptor positioned between said first and second generally vertically elongated hollow member, said first generally vertically elongated hollow member slidably engageable into said bottom end of said modular valve box adaptor, said top end of said first generally vertically elongated hollow member in stopped engagement with a respective step of said circumferentially stepped sidewall corresponding to said diameter of said first generally vertically elongated hollow member, said top end of said modular valve box adaptor dimensioned to slidably receive said bottom end of said first generally vertically elongated hollow member to a preselected depth.

8. The improved valve box in accordance with claim 7 wherein said modular valve box adaptor is formed with an arcuate perforation on said bottom end, selectively removable to allow said bottom end of said modular valve box adaptor to conform to and engage said upper annular surface of said hollow valve housing.

9. The improved valve box in accordance with claim 7 wherein said modular valve box adaptor has a plurality of decreased diameters of said circumferentially stepped sidewall from said bottom end to said top end.

10. The improved valve box in accordance with claim 7 wherein said modular valve box adaptor is engageable with said top end of said first generally vertically elongated hollow member wherein said first generally vertically elongated hollow member may have a plurality of different diameters.

11. The improved valve box in accordance with claim 7 wherein said modular valve box adaptor is frictionally engageable with said first generally vertically elongated hollow member.

12. The improved valve box in accordance with claim 7 wherein said modular valve box adaptor is formed by blow molding such that such inner surface and said outer surface are in conformance with each other.

13. A modular valve box adaptor for a valve box, said valve box comprised of a first generally vertically elongated hollow member open at its bottom end and its top end and having a hollow valve housing formed on the bottom end, said hollow valve housing adapted to receive a valve body and a second generally vertically elongated hollow member frictionally engageable with said first generally vertically elongated hollow member extending upwardly from said first generally vertically elongated hollow member and terminating in a collar and closure means, said modular valve box adaptor comprising a generally vertically elongated hollow member opened at its bottom end and its top end and positioned between said first generally vertically elongated hollow member and said second generally vertically elongated hollow member, said modular valve box adaptor having a circumferentially stepped sidewall presenting distinct decreased diameters from said bottom end towards said top end, said first generally vertically elongated hollow member slidably engageable into said bottom end of said modular valve box adaptor, said top end of said first generally vertically elongated hollow member in stopped engagement with a respective step of said stepped sidewall corresponding to said diameter of said first generally vertically elongated hollow member, said second generally vertically elongated hollow member having a lower end slidably positioned within said top end of said modular valve box adaptor and secured thereto, such that said collar and closure means are positioned in proximate planar alignment with the surface of the ground.

14. The modular valve box adaptor in accordance with claim 13 wherein said modular valve box adaptor is formed with an arcuate perforation on said bottom end, selectively removable to allow said bottom end of said modular valve box adaptor to conform to and engage said upper annular surface of said hollow valve housing.

15. The modular valve box adaptor in accordance with claim 13 wherein said modular valve box adaptor has a plurality of decreased diameters of said circumferentially stepped sidewall from said bottom end to said top end.

16. The modular valve box adaptor in accordance with claim 13 wherein said modular valve box adaptor is engageable with said top end of said first generally vertically elongated hollow member wherein said first generally vertically elongated hollow member may have a plurality of different diameters.

17. The modular valve box adaptor in accordance with claim 13 wherein said modular valve box adaptor is frictionally engageable with said first generally vertically elongated hollow member.

18. The modular valve box adaptor in accordance with claim 13 wherein said modular valve box adaptor is formed by blow molding such that said inner surface and said outer surface are in conformance with each other.

* * * * *